United States Patent [19]

Murray et al.

[11] Patent Number: 4,681,781
[45] Date of Patent: * Jul. 21, 1987

[54] SHIPPING BAG

[75] Inventors: Charles R. Murray, Toronto; Ray E. Harrison, Brampton, both of Canada

[73] Assignee: C-I-L Inc., North York, Canada

[*] Notice: The portion of the term of this patent subsequent to Mar. 18, 2003 has been disclaimed.

[21] Appl. No.: 830,858

[22] Filed: Feb. 19, 1986

Related U.S. Application Data

[63] Continuation of Ser. No. 631,540, Jul. 16, 1984, Pat. No. 4,576,844.

[30] Foreign Application Priority Data

Nov. 28, 1983 [CA] Canada ................................ 442097
Apr. 2, 1984 [CA] Canada ................................ 451106

[51] Int. Cl.⁴ ...................... B65D 30/08; B32B 27/08
[52] U.S. Cl. ...................................... 428/35; 428/349; 428/516; 383/109
[58] Field of Search ................ 428/516, 910, 349, 35; 383/109

[56] References Cited

U.S. PATENT DOCUMENTS

| | | | |
|---|---|---|---|
| 3,833,166 | 9/1974 | Murray | 383/107 |
| 4,147,291 | 4/1979 | Akao et al. | 428/516 |
| 4,360,550 | 11/1982 | Asakura et al. | 428/516 |
| 4,399,173 | 8/1983 | Anthony et al. | 428/35 |

Primary Examiner—John E. Kittle
Assistant Examiner—James J. Seidleck
Attorney, Agent, or Firm—Cushman, Darby & Cushman

[57] ABSTRACT

A thermoplastic heavy duty shipping bag having walls formed of cross-laminated outer plies of uni-axially oriented polyethylene and inner walls of low density polyethylene, heat sealed thereto. The bag provides improved puncture and snag resistance.

20 Claims, 6 Drawing Figures

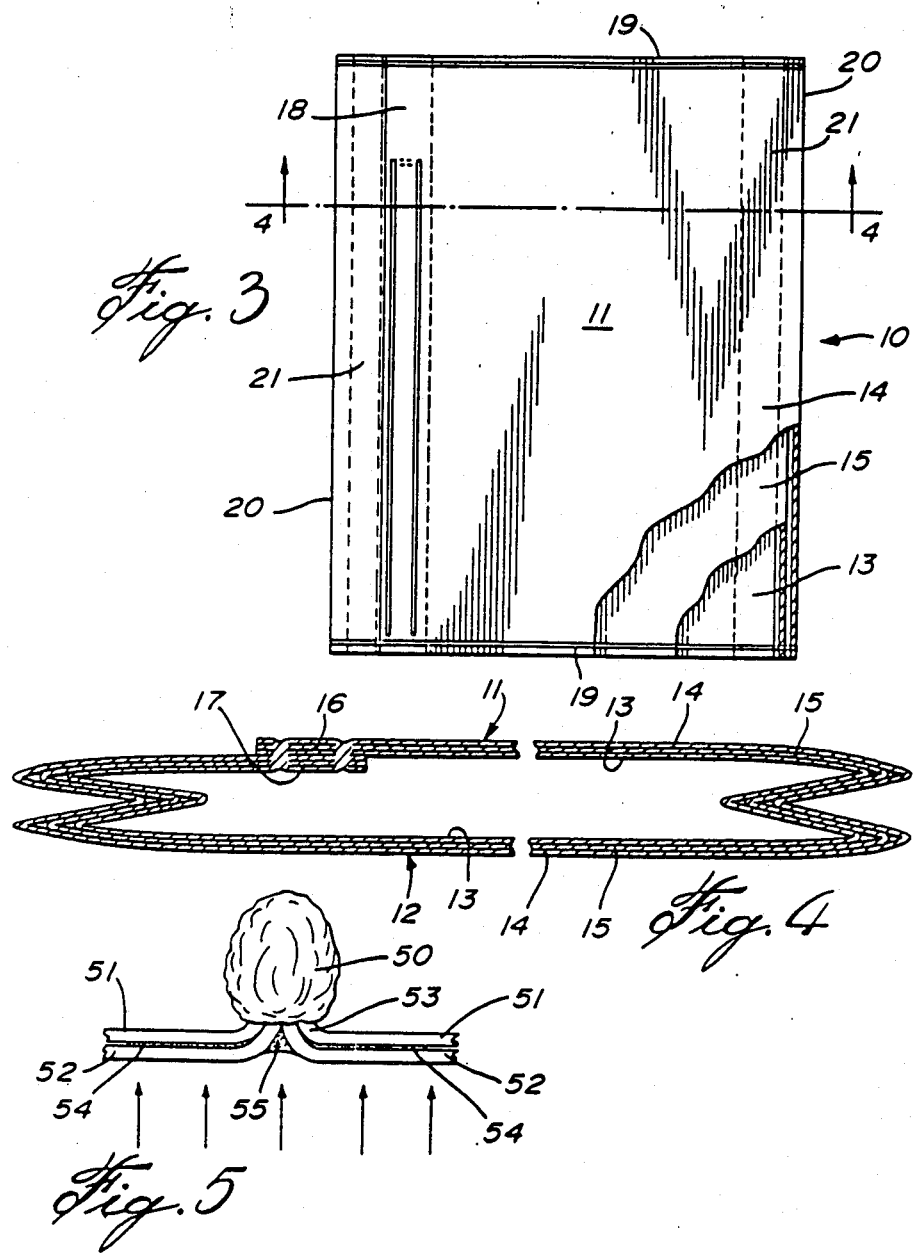

SHIPPING BAG

This is a continuation, of application Ser. No. 631,540, filed July 16, 1984, now U.S. Pat. No. 4,576,844.

BACKGROUND OF THE INVENTION

This invention relates to thermoplastic shipping bags and, particularly, to said bags for heavy duty use having one or more plies of a uni-axially oriented cross-laminated polyethylene.

Thermoplastic shipping bags are an economical means for the packaging, transportation and storage of a wide variety of products in granular, bead, pellet or powder form. These bags may be either open ended, requiring separate provision for closing, or fitted with a valved opening. The most commonly used type of thermoplastic bags are manufactured from film made by blown film processes using low density polyethylene and rubber modified high density polyethylene resins and coextruded versions of these resins and allied co-polymers. The film may be subsequently converted to bags by a variety of sealing techniques. Some of these simple thermoplastic films may be converted to bags by sewing but this has the disadvantage of badly weakening the films and introducing unwanted holes in the bag through which moisture or other contaminants can enter or allow environmental contaminants to exit. Other bags may be manufactured by the multiple folding and glueing of the bag ends, but this has the serious disadvantage of requiring very expensive converting equipment, as well as the use of expensive and difficult to control two component glue systems.

Because of these drawbacks the use of heat sealing is the desired method of manufacture of thermoplastic bags.

At the present, heat sealed thermoplastic bags are commonly used for the packaging of low cost, non-hazardous products. Their use for higher cost and hazardous products, however, has been badly restricted because of the poor puncture and snag resistance of the bags compared with multi-wall paper or woven plastic bags of related composition structures.

It is known in the art that the required level of puncture and snag resistance can be built into a thermoplastic film manufactured from linear ethylene polymers such as high density polyethylene or linear low density polyethylene, by uni-axially cold drawing such film and subsequently laminating two of these layers in such a manner that the draw-induced orientation of one web typically is 90° to that of the other web. Thus, the uni-axially oriented sheets of polyethylene are laminated one to the other in such a manner that the directions of orientation cross each other. The resulting composite laminated film, generally known as a cross-plastic, cross-laminate, or cross-laminate ply has high puncture and snag resistance compared to an equivalent gauge non-oriented blown film. Films of this type have thus been used for sewn and glued shipping bags for high value and hazardous materials.

However, these materials have one serious drawback in that they cannot reliably be heat sealed on conventional bag making machinery to provide bags for heavy duty use. This has seriously impeded their utility and acceptability in the market place notwithstanding the aforementioned advantages of heat sealed bags.

SUMMARY OF THE INVENTION

Surprisingly, we have now found that this unacceptable heat seal drawback can be overcome to produce an improved heavy duty shipping bag by interposing a double layer of low density polyethylene, which has not been cold drawn (i.e., has not been uni-axially oriented), between the two cross-laminated films to be heat sealed together to form the walls of the bag. We have surprisingly found that these layers of low density polyethylene in the heat seal area can be welded to each other and to the cross-laminated film or ply without heat build up sufficient to cause serious loss of cold draw-induced film strength. Thus, an acceptable bridge between the high strength cross-laminated film and the body of the heat seal is formed. This is to be contrasted with the fact that although two cross-laminated films in the absence of interposed low density polyethylene film could be melted and fused together to produce welded bonds, the cross-laminated film immediately adjacent to the welded mass has its cold draw orientation destroyed by the heat from the seal with consequent loss of film strength in this margin area; whereby the seals so produced are weak and brittle in the margin area, rendering them unacceptable for use in heavy duty shipping bags.

It has thus now been found that a suitable thermoplastic shipping bag having improved puncture and snag resistance can now be reliably manufactured by heat sealing techniques using suitably modified conventional equipment.

Thus, in its simplest form the invention provides a thermoplastic shipping bag having a front wall and a back wall, each wall comprising a cross-laminated ply comprising at least two sheets of uni-axially oriented polyethylene bonded together; said laminated plies heat sealed one to the other to provide a heat seal area and wherein interposed between said laminated plies in said heat seal area are two layers of low density polyethylene.

Each of the interposed layers of low density polyethylene may constitute simply a sheet of polyethylene of sufficient area and thickness in the heat seal area to effect an acceptable bridge between the two laminated plies in this area to form a seam. However, these interposed layers of low density polyethylene may extend beyond the heat seal area to represent a full ply adjacent the full surface of each of the laminated plies. Thus, each of the cross-laminated plies comprising the walls of the shipping bag have a layer of low density polyethylene adjacent thereto. Such a structure, of course, does not detract from the requirement that the laminated plies need only be heat sealed at designated heat seal areas. These areas constitute those parts of the bag, generally parts of the periphery, where the front and back walls are joined by heat sealing during manufacture. Each of the sheets of low density polyethylene must be of sufficient thickness to effect an acceptable bridge between the two cross-laminated plies. We have found that a sheath of such thinness to provide mere coating of low density polyethylene on each of the cross-laminated plies is not sufficient, and that a minimum thickness of 0.5 mil of low density polyethylene is required, preferably >1.5 mil.

We have also found that each of the cross-laminated plies constituting the walls of the bag must have its own associated sheet of low density polyethylene to provide an acceptable heat seal for heavy duty bag use. For reasons hereinafter discussed, a single interposed layer of low density polyethylene, represented as a distinct ply, is not satisfactory. Thus, a double layer of polyethylene is required.

In a much preferred form of a bag according to the invention the interposed layers of low density polyethylene represent full and distinct plies constituting part of the walls of the bag.

Accordingly, the invention further provides a bag as hereinbefore described wherein each of said layers of low density polyethylene constitutes an inner ply of the bag.

In this preferred form of bag each of the walls comprising a cross-laminated ply has an interposing ply of low density polyethylene associated therewith. In this arrangement, each of the interposing plies may be considered as being an inner wall of the bag while the two cross-laminated plies considered as being the two outer walls.

Accordingly, the invention further provides a thermoplastic shipping bag comprising a front wall and a back wall heat sealed thereto, each of said walls comprising a cross-laminated outer ply comprising at least two sheets of uni-axially oriented polyethylene bonded together, and heat sealed thereto, an inner wall formed of low density polyethylene.

When a bag containing a fluid product is dropped a major amount of the kinetic energy from the product is transmitted to the bag walls upon impact as the walls prevent the product from flowing outward. This energy is absorbed by the bag walls stretching. The peak force build-up in the bag walls during this energy absorption is dependent on the elasticity of the bag walls. If the peak force build-up on impact is greater than the tensile yield strength of the bag walls the bag will be permanently stretched. When this peak force is greater than the ultimate tensile strength of the walls the bag will rupture at the weakest points. When a heat seal is introduced into a bag walls the ultimate tensile strength of the heat seal at its weakest section should be greater than the tensile yield strength of the bag walls to maximize the impact strength of the heat seal.

In uni-axially oriented cross-laminated cold drawn films, such as "VALERON"* high density polyethylene, the yield tensile strength of the film is higher than the ultimate tensile strength of the plastic resin mass from which it is made. When the film is heat sealed and orientation of the film is destroyed in the heat seal margin which results in a drastic reduction in both the yield tensile strength and the ultimate tensile strength.

* Trade Mark

A 'laminated seal' is understood in the art to be a seal wherein the joining interfaces of the films can be separated by the physical pulling apart of the bonded film without the destruction of the film and thus effecting a relatively clean separation. On the other hand a 'heat seal' in the art is understood to be a seal produced under a combination of pressure and heat, at or above the films' crystalline melting points, applied to the films in order that they are truly welded at their interfaces such that a clean separation cannot be effected by physical or chemical means.

We have surprisingly found that a heat seal as hereinbefore defined when integrally formed with an adjacent laminated seal has improved seal strength. Thus, by the term 'heat seal' as used in this specification and claims is meant a heat seal as hereinbefore defined having an adjacent laminated seal integral therewith. The adjacent laminated seal has a length of at least 2 mm.

We have found that in order to prevent stress from building up only in the heat sealed junction of the oriented and non-oriented films these layers must be laminated sealed together adjacent the heat seal mass so that the stress is also taken up by the adjacent multi-ply laminate. It will be realized that film stretching is a two dimensional effect, i.e. if a film is stretched only in one direction it tends to neck down in the other if unrestrained. Therefore, if the inner non-oriented layer is totally laminated to the less elastic oriented outer layer it will take on the neck down characteristics of the total laminate. It is nonetheless necessary that laminations extend between the layers in close proximity to the heat seal. A length of only 5-10 mm for the adjacent laminated seal integral with the heat seal mass is the most desirable length. Further, we have found that a single layer of non-oriented polyethylene between the two oriented layers reduces the utility of this invention since that laminated section of the seal between the single ply and the double ply peels away under the constant pressure exerted when bags are loaded and stacked.

By the term "thermoplastic", as used herein is meant any thermoplastics material capable of providing a film, ply or layer of suitable thickness and strength for a heavy duty shipping bag. Of particular use are thermoplastics of the polyethylene and polybutadiene family of polymers. As examples, high density and low density polyethylenes and 1,2 polybutadienes may be mentioned.

The term "low density polyethylene" includes ethylene homopolymers and copolymers, such as the linear low density polyethylenes, vinyl acetate copolymers, and blends thereof.

The term "inner wall" is meant not to be restricted solely to the actual of true inner wall of the bag which contacts product when the bag is filled. The term also includes the situation, for example, where one or more plies of non-oriented low density polyethylene constitute plies in a multi-wall bag which plies may or may not be adjacent the true inner wall. Similarly, the term "outer ply" is meant not to be restricted solely to the most external ply.

Thus, it should be understood that the principles of the invention are applicable also to the fabrication of bags having walls individually comprising more than two plies. Thus, the invention embraces bags having three plies, four plies, etc. The important and essential feature is that there must be at least one ply of non-oriented low density polyethylene constituting each of the inner surfaces of the bag such that a cross-laminated ply of polyethylene does not contact another cross-laminated ply of polyethylene at a designated heat seal area of an inner surface such as to weaken a heat seal.

In preferred embodiments of the bags according to the invention as hereinbefore and hereinafter defined the interposed layer of low density polyethylene represented as a distinct inner ply or inner wall, is formed of blown linear low density polyethylene. However, it is readily apparent that cast films are also suitable for this application.

Preferably each of the cross-laminated plies comprises at least two sheets of uni-axially oriented low density polyethylene, more preferably linear low density polyethylene, and yet, more preferably, high density polyethylene.

Where the cross-laminated ply comprises sheets of uni-axially oriented high density polyethylene, the sheets may be bonded together, for example, with a layer of non-oriented high density polyethylene. Where the laminated ply comprises sheets of uni-axially oriented low, or preferably, linear low density polyethylene, these may be bonded together with non-oriented low density polyethylene or, preferably, linear low density polyethylene.

In one form, bags according to the invention comprise two inner linings or walls of non-oriented low density polyethylene film, heat sealed at their peripheries to plies of cross-laminated polyethylene film. The low density polyethylene inner lining or wall may, however, be also heat sealed to the cross-laminated ply intermittent over other parts of their respective facing surfaces, provided that there is not sufficient heat build-up to cause serious loss of film strength in the cross-laminated ply. Generally, the inner wall and cross-laminated outer ply are heat sealed at and around all, or part of, their peripheries; these being the principal heat seal areas. The arrangement and positions of the heat seal areas will depend on the type of shipping bag, and it is well within the skill of the art for such areas to be identified.

While it is generally accepted that all polyethylene film is generally uni-axially oriented to some degree, the term "uni-axially oriented" when used with reference to polyethylene in this specification and claims means polyethylene film that has been blown and cold drawn to at least a 2.5-fold extent, preferably to a 4-fold extent, but also up to a 6-fold extent. The orienting and cross-laminating of the films may be carried out according to well-known methods.

A typical uni-axially oriented cross-laminated ply may be made by extruding respective tubular high density polyethylene or low density polyethylene film and cold drawing this tubing down by a factor of four times in the machine direction to produce film with extremely high MD tensile and TD tear properties. The tubing is then subsequently spirally split into sheeting whereby the film orientation is typically at an angle of 45° to the new web MD machine direction. Two sheets of this sheeting may then be extrusion laminated with a thin layer of non-oriented high density polyethylene or low density polyethylene as is appropriate.

The cold drawn cross-laminated film may be made from low density and high density polyethylene resins and blends thereof, and can be used in a variety of thicknesses. One particular blend of use in the practice of the invention comprises linear low density and high density polyethylenes in the ratio of 9:1. Increasing the relative amount of high density polyethylene in such a blend enhances the puncture resistance and tensile strength of the film.

It is not necessary that all plies of the bag be made of the same materials as those of use in the practice of the invention. With the ability to introduce compatible but dissimilar materials, specially designed bags can be produced with plies allowing the packaging of fine powders, oil-bearing materials, materials that are hot at the point of packaging, etc.

Thus, the bags according to the invention may also comprise one or more plies formed of other thermoplastic compatible packaging materials without detracting from the principles of the invention.

Also, it will be understood that the scope of the invention as claimed also embraces those thermoplastic bags wherein only a part of the manufactured bag incorporates the important and essential feature of the invention as hereinbefore set forth and wherein other parts of the bag are joined in an alternative manner, for example, by hot melt or adhesive bonding. The arrangement and positions of those other parts joined in an alternative manner may be readily selected by the skilled man.

A two-ply bag is the simplest embodiment of this invention. However, in some instances it is advantageous to have more than two inner plies of non-oriented film constituting the inner layers of the bag, i.e., between the front and back cross-laminated outer sides of the bag. An example of this would be a bag of the simplest embodiment with an additional thin true inner ply of linear low density polyethylene in the form of a fine filter mesh to allow air to be filtered from powdered products, as described in our copending Canadian Application Ser. No. 438,484, filed Oct. 6, 1983.

In other instances it may be preferred to have additional plies of film outermost of the cross-laminated ply. Such an outer ply could give the benefit resulting from introducing blown low density polyethylene film between the gussetted surfaces of cross-laminated plies to give the same improvements in seal quality as created on the innermost parts of the bag. The squared-off appearance of the final package resulting from this gussetting improves its performance for palletizing and stacking.

An additional benefit to be gained from such an outer layer is that the surface can be suitably roughened by the addition of high molecular weight granules to the film during film extrusion; thus, imparting additional improved handling properties to the bag. As well, the inner surface of this outer ply can be printed and the resulting message thus locked between plies to escape abrasion and distortion during the handling of filled packages. It can readily be seen that the utility of this outer ply can be expanded by using a laminate or coextrusion film to impart special properties to the bag, i.e., oil barrier or grease resistant layers.

Accordingly, in a further feature the invention provides a thermoplastic shipping bag of the open-top type having a front side and a back side characterised in that each of said front side and said back side comprises a cross-laminated outer ply comprising at least two sheets of uni-axially oriented polyethylene bonded together, and heat sealed thereto, an inner wall formed of low density polyethylene.

An open-top shipping bag according to the invention may be made by feeding a web of the uni-axially oriented crosslaminated film in conjunction with an inner web of blown low density polyethylene through commercial side-weld, heat sealed or back seamed and bottom heat sealed bag making equipment.

One particularly useful type of thermoplastics shipping bag is that known as a valved bag. One such embodiment is described in our U.S. Pat. No. 3,833,166. These bags posses the important commercial advantage of being easily filled through a valve structure with the self-closing of this valve structure after filling.

Accordingly, in a further feature the invention provides a thermoplastic shipping bag of the valved bag type having a front side and a back side joined together around the entire periphery of the bag and a filling aperture characterised in that each of said front side and said back side comprises a cross-laminated outer ply comprising at least two sheets of uni-axially oriented polyethylene bonded together, and heat sealed thereto, an inner wall formed of low density polyethylene.

In a more preferred feature the invention provides a thermoplastic valved bag of the type having a front side and a back side joined together around the entire periphery of the bag, said front side consisting of a first panel and a second panel, of greater combined width than the width of said back side, said first panel at least partially overlapping said second panel throughout the length of the bag and said panels in their common area being joined together along a line substantially parallel with and at a distance from one end of the bag, thus forming a tubular self-closing filling sleeve having inner and outer walls and extending transversely of the bag adjacent to said one end thereof, with said first panel forming the outer wall and said second panel forming the inner wall of said filling sleeve, and being also joined together along at least one line extending from said first-mentioned line substantially to the opposite end of the bag, said second panel consisting of at least two plies that are non-coextensive with each other so that at least the inner end portion of the inner wall of said filling sleeve is formed of a number of plies that is less than the total number of plies in said second panel, characterised in that each of said front side and said back side comprises a cross-laminated outer ply comprising at least two sheets of uni-axially oriented polyethylene bonded together, and heat sealed thereto, an inner wall formed of low density polyethylene.

Several embodiments of this invention will now be more particularly described by way of example only with reference to the accompanying drawings, in which:

BRIEF DESCRIPTION OF THE DRAWINGS

FIG. 3 is a front elevational view of a valved bag according to the invention;
FIG. 4 is a sectional view along the line IV—IV of FIG. 3;
FIG. 5 is a diagramatic view of a section through a heat seal as hereinbefore defined of use in the practice of the invention;

DETAILED DESCRIPTION OF THE PREFERRED EMBODIMENT

Figure 1:
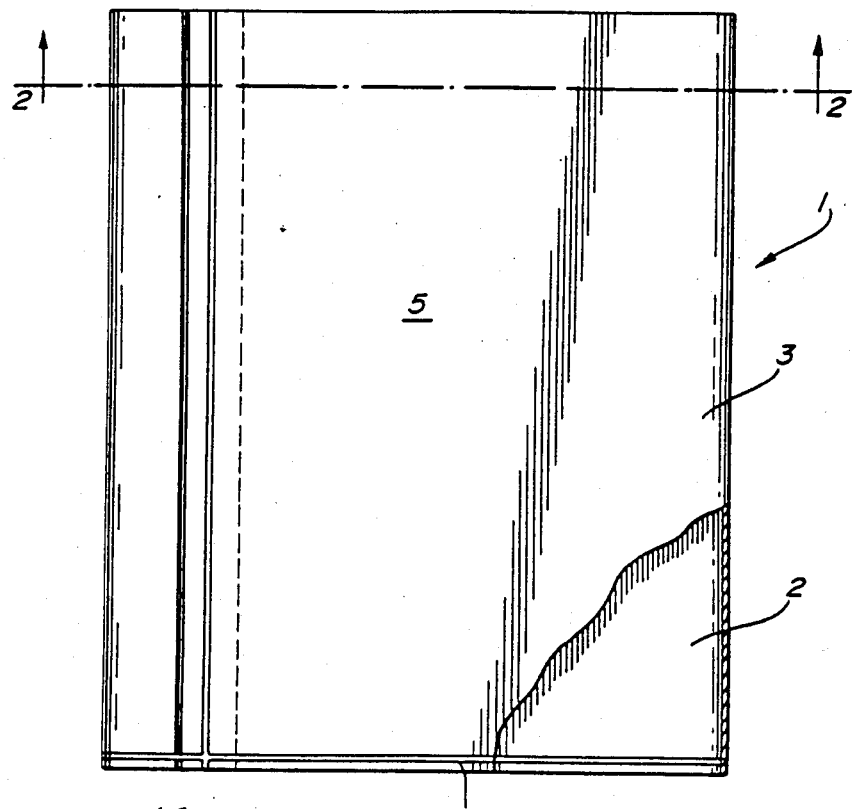
FIG. 1 is a front elevational view of an open-top bag according to the invention.
Figure 2:
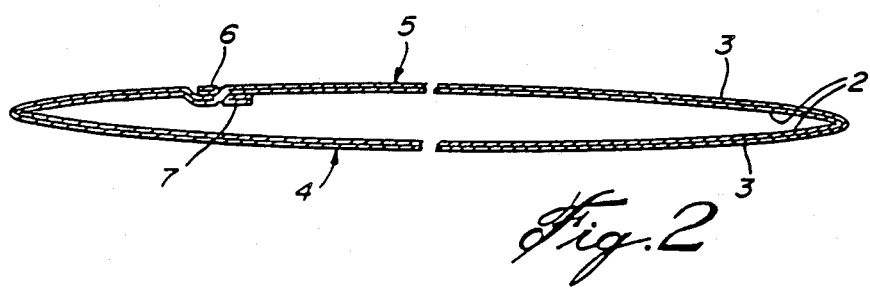
FIG. 2 is a sectional view along line II—II of FIG. 1.

FIGS. 1 and 2 show a generally rectangular two-ply pillow-type bag 1 having an inner wall 2 formed of blown linear low density polyethylene film (3 mil) manufactured from "2045" linear low density polyethylene resin (Dow Chemical Co.), and an outer ply 3 (3.5 mil) of uni-axially oriented cross-laminated linear low density polyethylene film, commercially available under the trade mark "VALERON"*.

* trade mark

The bag 1 has thus a two-ply back wall 4, and a two-ply front wall 5 made up of first and second partially overlapping panels 6 and 7. The outer ply 3 of back wall 4 is continuous with the outer wall 3 of front wall 5 except where separated and joined together by heat sealing with layer 2 in the overlapping panels 6 and 7. Thus, the walls 4 and 5 are integral and form a two-ply tube. One end of the tube 8 is heat sealed to form a simple two-ply open-top bag.

The bag was made by feeding a web of 37" film 3 into a longitudinal folding frame with a web of film 2 and forming a two-ply tube 18" wide with a 1" overlapping portion. The four plies of the overlapping area were then heat sealed longitudinally to consolidate the two-ply tubing which was then passed to a transverse heat seal unit which made the bottom seal 8. A 26" length of tube with the heat seal present was cut from the web by a guillotine to form the open top bag 1.

To test the strength of the heat seals, the bag 1 was filled with 50 pounds of granular salt, heat sealed at its open end by a "Dough boy" heat sealer, and drop tested on each side, edge and butt from a height of 10 feet. There was no rupture of any film or seal. The open top of the bag is generally heat sealed after filling with product to produce an airtight and watertight package. Because it is extremely difficult to exclude all air from the filled package prior to the heat sealing operation, it is preferable to perforate the walls of the bags with pinholes typically 0.025" in diameter to facilitate air release, the number of holes required depending on the amount of air left in the bag and the type of product being packaged. In those cases where it is critical that the package retains its maximum value for air tightness and moisture protection, the perforation holes in the inner and outer plies are offset typically by $1\frac{1}{2}$" to create an indirect path to air/product mixes during the venting period.

Although the inner ply 2 of the bag is described as a single ply of sheeting it can be readily appreciated that a two-ply tube of 1.5 mil could also be used instead. Indeed since tubing may be less expensive to manufacture the tube could be a preferred option. Again, although the outer wall is described as a linear low density polyethylene crosslaminated film, high density polyethylene cross-laminated film would be the preferred embodiment for applications where extra heat resistance is required of the package.

FIGS. 3 and 4 show a generally rectangular threeply pillow type bag 10 having a front side 11 and a back side 12 joined together around the entire periphery of the bag. Front side 11 consists of an inner wall 13 and an outer wall 14 formed of blown linear low density polyethylene (3 mil), and a middle wall 15 of uni-axially oriented cross-laminated linear low density polyethylene film, (3.5 mil) "2045" (Dow Chemical Co.) resin. Back side 12 is of an identical construction.

Front side 11 has partially overlapping panels 16 and 17 heat sealed together longitudinally to form a three-ply tube open only to form a self-closing filling sleeve 18. The tube is heat sealed at both ends 19 to form a complete valved bag of the type illustrated in our U.S. Pat. No. 3,833,166. In the embodiment shown the bag has its lateral edges 20 tucked in and heat sealed in the longitudinal region 21 through twelve layers of film.

It will be noted that in all the heat seal areas the uni-axially oriented cross-laminated film is never sealed to itself but always has a double layer of non-oriented film between mating seal surfaces even in the twelve-ply heat seal areas 19.

It is, of course, desirable to have this tucked-in multiple seal area to give the filled bag a squared configuration.

Again, it will be appreciated that tubing could be substituted for sheeting in layers 13 and 14.

Besides the advantage of allowing the bag to be gusset sealed, the outer ply can be reverse printed to lock the print between plies 14 and 15 to protect it from abrasion in transit. Additionally, a small amount (0.5%) of 40 mesh high molecular weight high density polyethylene resin can be incorporated in layer 14 during extrusion to produce a pebbled surface to confer excellent handling properties on the filled bags.

FIG. 5 shows a polyethylene heat seal in a bag loaded with product wherein the seal is under tension due to the product acting in a manner tending to separate the plies. The figure shows a polyethylene heat seal mass 50 resulting from the fusion of part of the two oriented high density polyethylene films 51 and the two non-oriented linear low density polyethylene films 52. Integral with heat seal mass 50 at heat seal margin 53 are laminated seals 54, extending along each of the two adjacent plies 51 and 52. There is a relatively minor lamination seal 55 between the two plies 52.

The presence of the laminated seal integral with the heat seal can be accomplished by the application of a gradient heat seal bar unit to the films whereby the lamination is effected at the same time as the heat seal. Alternatively, it can be accomplished in a two stage operation wherein a laminated seal is first made, typically of a 1" width, by joining the plies at a temperature lower than the melting point of the cross-laminated polyethylene (to prevent destruction of the orientation), typically, 240° F. Subsequently, a side weld heat seal is made through the laminated section by the application of temperature and pressure.

We have found that the thickness of the inner layers of low density polyethylene required to produce an acceptable heat seal will depend greatly on the elasticity of the cross laminate film to be used, i.e. the less elastic the cross laminate film the thicker the low density polyethylene film must be. Relative thicknesses of all the polyethylene layers can be readily determined by the skilled man.

We claim:

1. A thermoplastic shipping bag comprising a front wall and a back wall heat sealed thereto, each of said walls comprising a cross-laminated outer ply comprising at least two sheets of uni-axially oriented polyethylene bonded together, and heat sealed thereto, an inner wall formed of low density polyethylene, said inner wall comprising a distinct inner ply.

2. A bag as claimed in claim 1 wherein said inner wall includes linear low density polyethylene.

3. A bag as claimed in claim 1 or claim 2 wherein each of said cross-laminated outer plies comprises at least two sheets of uni-axially oriented high density polyethylene bonded together.

4. A bag as claimed in claim 1 or claim 2 wherein each of said cross-laminated outer plies comprises at least two sheets of uni-axially oriented low density polyethylene.

5. A bag as claimed in claim 1 or claim 2 wherein each of said cross-laminated outer plies comprises at least two sheets of uni-axially oriented linear low density polyethylene.

6. A thermoplastic shipping bag of the open-top type having a front side and a back side, each of said front side and said back side comprises a cross-laminated outer ply comprising at least two sheets of uniaxially oriented polyethylene bonded together, and heat sealed thereto, an inner wall formed of low density polyethylene said inner wall comprising a distinct ply.

7. A bag as claimed in claim 6 wherein said inner wall includes linear low density polyethylene.

8. A bag as claimed in claim 6 or claim 7 wherein each of said cross-laminated outer plies comprises at least two sheets of uni-axially oriented high density polyethylene bonded together.

9. A bag as claimed in claim 6 or claim 7 wherein each of said cross-laminated outer plies comprises at least two sheets of uni-axially oriented low density polyethylene.

10. A bag as claimed in claim 6 or claim 7 wherein each of said cross-laminated outer plies comprises at least two sheets of uni-axially oriented linear low density polyethylene.

11. A thermoplastic shipping bag of the valved bag type having a front side and a back side joined together around the entire periphery of the bag and a filling aperture characterized in that each of said front side and said back side comprises a cross-laminated outer ply comprising at least two sheets of uni-axially oriented polyethylene bonded together, and heat sealed thereto, an inner wall formed of low density polyethylene, said inner wall comprising a distinct ply.

12. A bag as claimed in claim 11 wherein said inner wall includes linear low density polyethylene.

13. A bag as claimed in claim 11 or claim 12 wherein each of said cross-laminated outer plies comprises at least two sheets of uni-axially oriented high density polyethylene bonded together.

14. A bag as claimed in claim 11 or claim 12 wherein each of said cross-laminated outer plies comprises at least two sheets of uni-axially oriented low density polyethylene.

15. A bag as claimed in claim 11 or claim 12 wherein each of said cross-laminated outer plies comprises at least two sheets of uni-axially oriented linear low density polyethylene.

16. A thermoplastic shipping bag of the valved bag type having a front side and a back side joined together around the entire periphery of the bag, said front side comprising a first panel and a second panel, said first and second panels having a greater combined width than a width of said back side, said first panel at least partially overlapping said second panel throughout a length of the bag, said panels in their overlapping area being joined together along a line substantially parallel with and at a distance from one end of the bag, thus forming a tubular self-closing filling sleeve having inner and outer walls and extending transversely of the bag adjacent to said one end thereof, with said first panel forming the outer wall and said second panel forming the inner wall of said filling sleeve, said second panel comprising at least two plies that are non-coextensive with each other so that at least an inner end portion of the inner wall of said filling sleeve is formed of a number of plies that is less than the total number of plies in said second panel, each of said front side and said back side comprises a crosslaminated outer ply comprising at least two sheets of uniaxially oriented polyethylene bonded together, and heat sealed thereto, an inner wall formed of low density polyethylene said inner wall forming a distinct ply.

17. A bag as claimed in claim 16 wherein said inner wall includes linear low density polyethylene.

18. A bag as claimed in claim 16 or claim 17 wherein each of said cross-laminated outer plies comprises at least two sheets of uni-axially oriented high density polyethylene bonded together.

19. A bag as claimed in claim 16 or claim 17 wherein each of said cross-laminated outer plies comprises at least two sheets of uni-axially oriented low density polyethylene.

20. A bag as claimed in claim 16 or claim 17 wherein each of said cross-laminated outer plies comprises at least two sheets of uni-axially oriented linear low density polyethylene.

* * * * *